June 20, 1944.  C. B. SEEM  2,351,841
DOUGH DIVIDER AND ROUNDER
Filed July 27, 1943   5 Sheets-Sheet 1

Inventor
Charles B. Seem
By Chuck & Chuck
His Attorneys

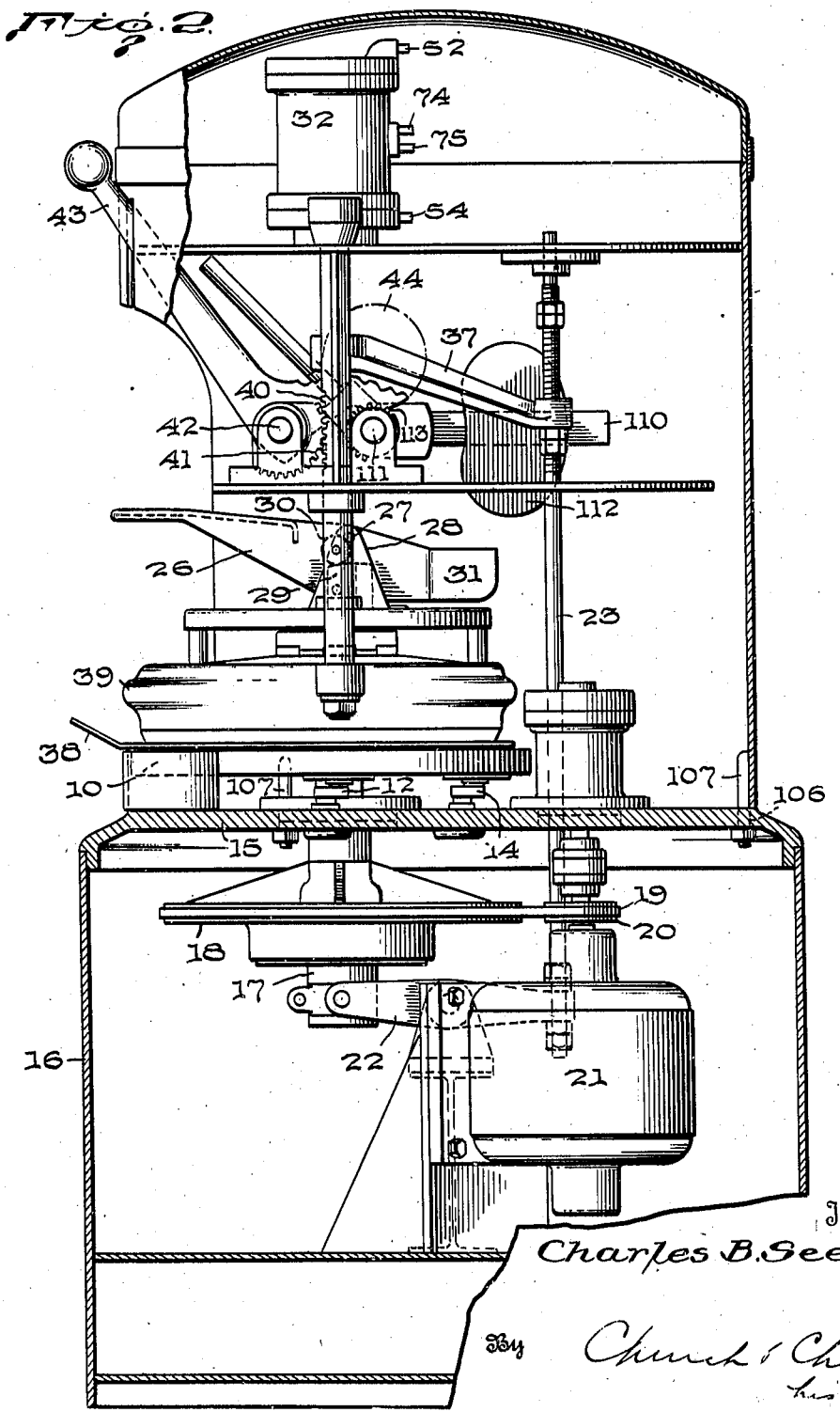

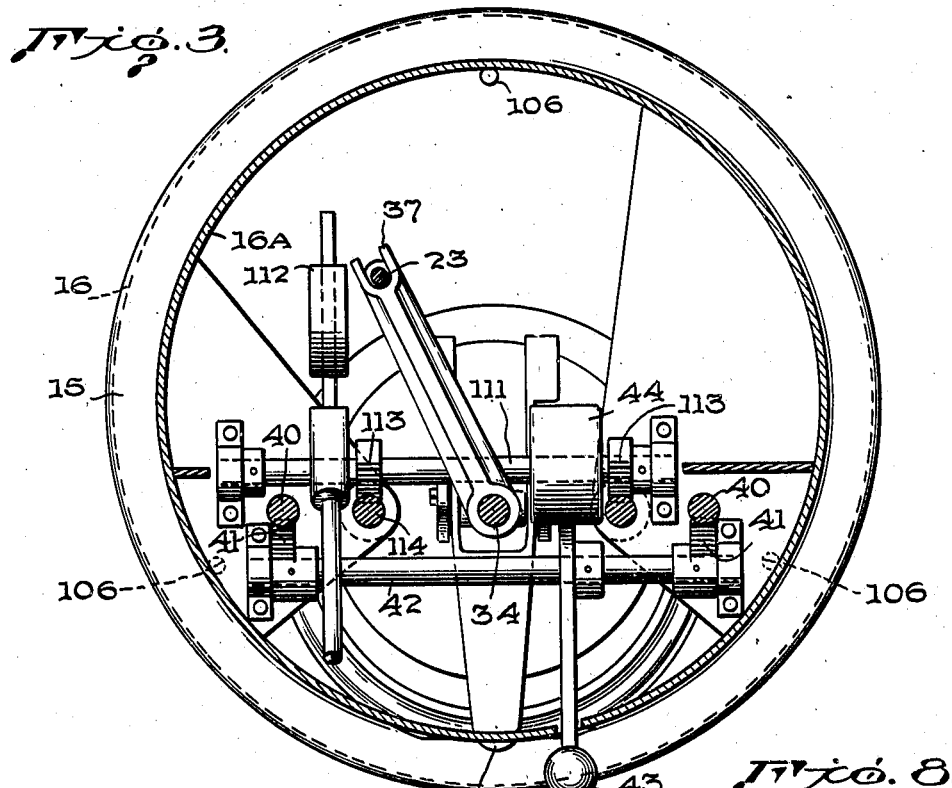
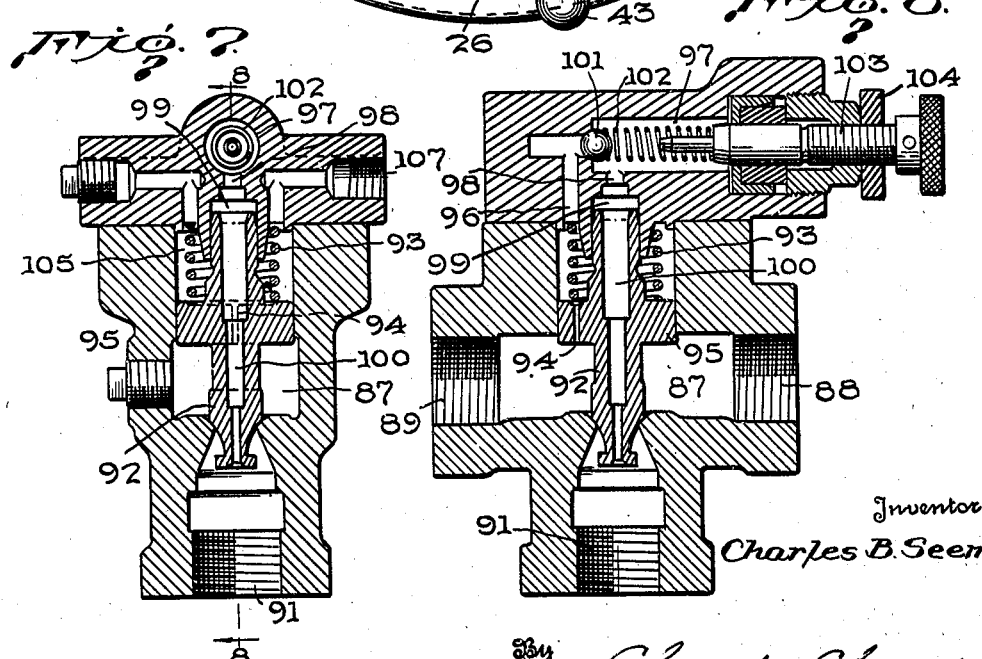

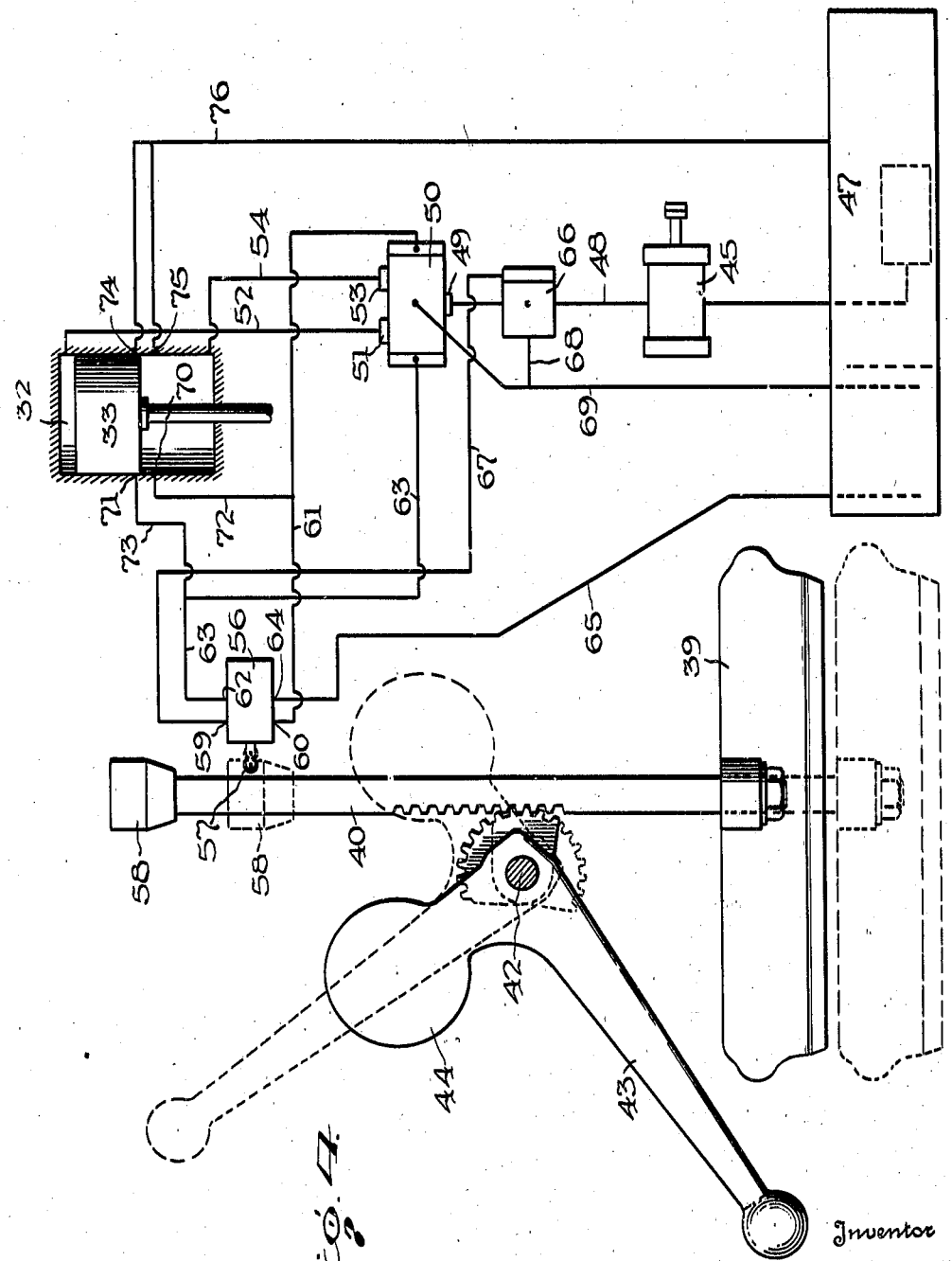

June 20, 1944.  C. B. SEEM  2,351,841
DOUGH DIVIDER AND ROUNDER
Filed July 27, 1943  5 Sheets-Sheet 5
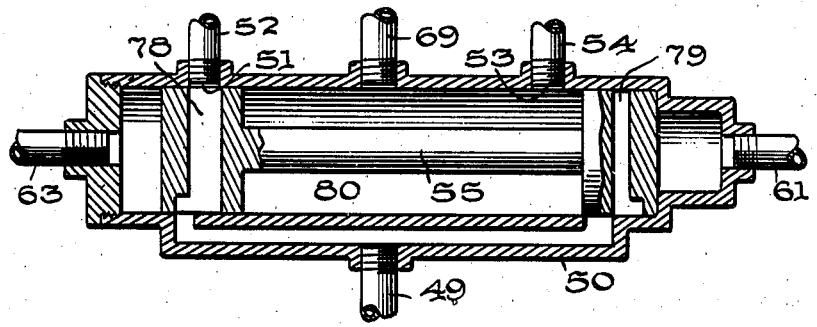
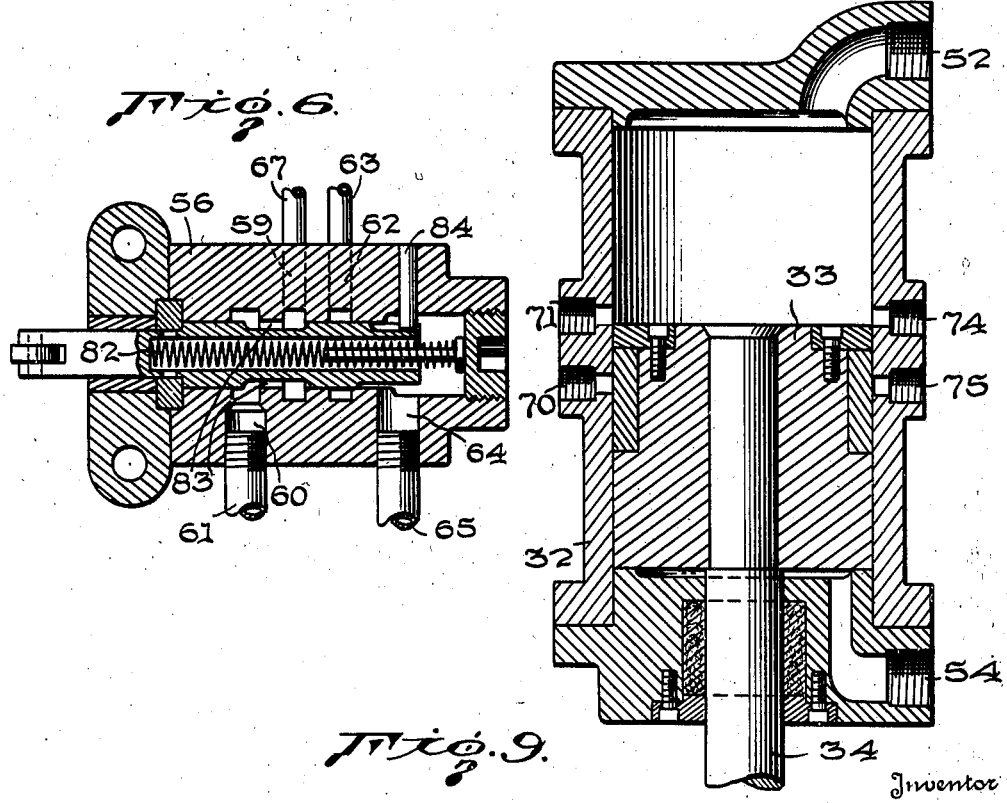
Inventor
Charles B. Seem
By Church & Church
his Attorneys Patented June 20, 1944

2,351,841

UNITED STATES PATENT OFFICE 2,351,841

DOUGH DIVIDER AND ROUNDER

Charles B. Seem, Beacon, N. Y., assignor to Dutchess Tool Company, Inc., Beacon, N. Y., a corporation of New York Application July 27, 1943, Serial No. 496,315

11 Claims. (Cl. 107—20)

This invention relates to improvements in dough dividers and rounders and particularly to the type of divider and rounder shown in United States Letters Patent No. 2,158,594, dated May 16, 1939, wherein a mass of dough confined within a ring on a dough-supporting surface or table is pressed flat, then divided into increments which, as a group, represent a pan of rolls, and the increments rounded up into the shape of individual rolls.

The pressing and dividing of the mass of dough is accomplished by a divider head comprising a plurality of presser plugs and knives adapted to be raised and lowered with respect to the dough-supporting surface or table, these movements of the divider head being effected by power operated means which, in some instances, have taken the form of a fluid actuated piston on which the divider head is carried. The ring member by which the dough is confined on the supporting table while being pressed, divided and rounded-up, is also adapted to be raised and lowered with respect to the table, and, in the use of machines of this type, wherein the divider head is power-operated, there have been a number of instances where the attendant has been injured by having his hand caught between the divider head and table while the confining ring was in its elevated position. The primary object of the present invention, therefore, has to do with eliminating this danger of injury of the attendant under the conditions just described.

Another object is to provide means for preventing the divider head being lowered to the table while the confining ring is in its elevated position. More particularly, the invention contemplates a roll divider and rounder wherein the divider head is raised and lowered by a fluid operated piston in a cylinder to which the flow of actuating fluid is controlled by or is responsive to the movements of the confining ring. Specifically, the confining ring is carried by a manually operated supporting member, for instance, a rack bar, and said bar is adapted to actuate a valve which controls the flow of fluid to said cylinder and piston in such fashion that the piston, with the divider head, cannot be lowered so long as the rack and ring are in their elevated positions.

Still another object is to provide a roll dough divider and rounder wherein the divider head and rounding-up mechanism are housed in a substantially two-part sectional housing of cylindrical formation which can be readily assembled and disassembled and which imparts a stream-lined appearance to the machine as a whole.

With these and other objects in view, the invention consists in certain details of construction and combinations and arrangements of parts, all as will hereinafter be more fully described and the novel features thereof particularly pointed out in the appended claims.

In the accompanying drawings illustrating the preferred embodiment of the present invention—

Fig. 2 is a side elevation, partly in section;

Fig. 3 is a top plan view;

Fig. 4 is a diagrammatical illustration of the actuating fluid circuits for controlling and operating the divider head;

Fig. 5 is a detail sectional view of the control valve for directing fluid to opposite ends of the divider head operating cylinder;

Fig. 6 is a detail sectional view of the pilot valve for operating the control valve;

Fig. 7 is a detail sectional view of the relief valve for the fluid operating system;

Fig. 8 is a sectional view of the relief valve on the line 8—8 of Fig. 7; and

Fig. 9 is a detail sectional view of the main operating cylinder for the divider head.

Figure 1:
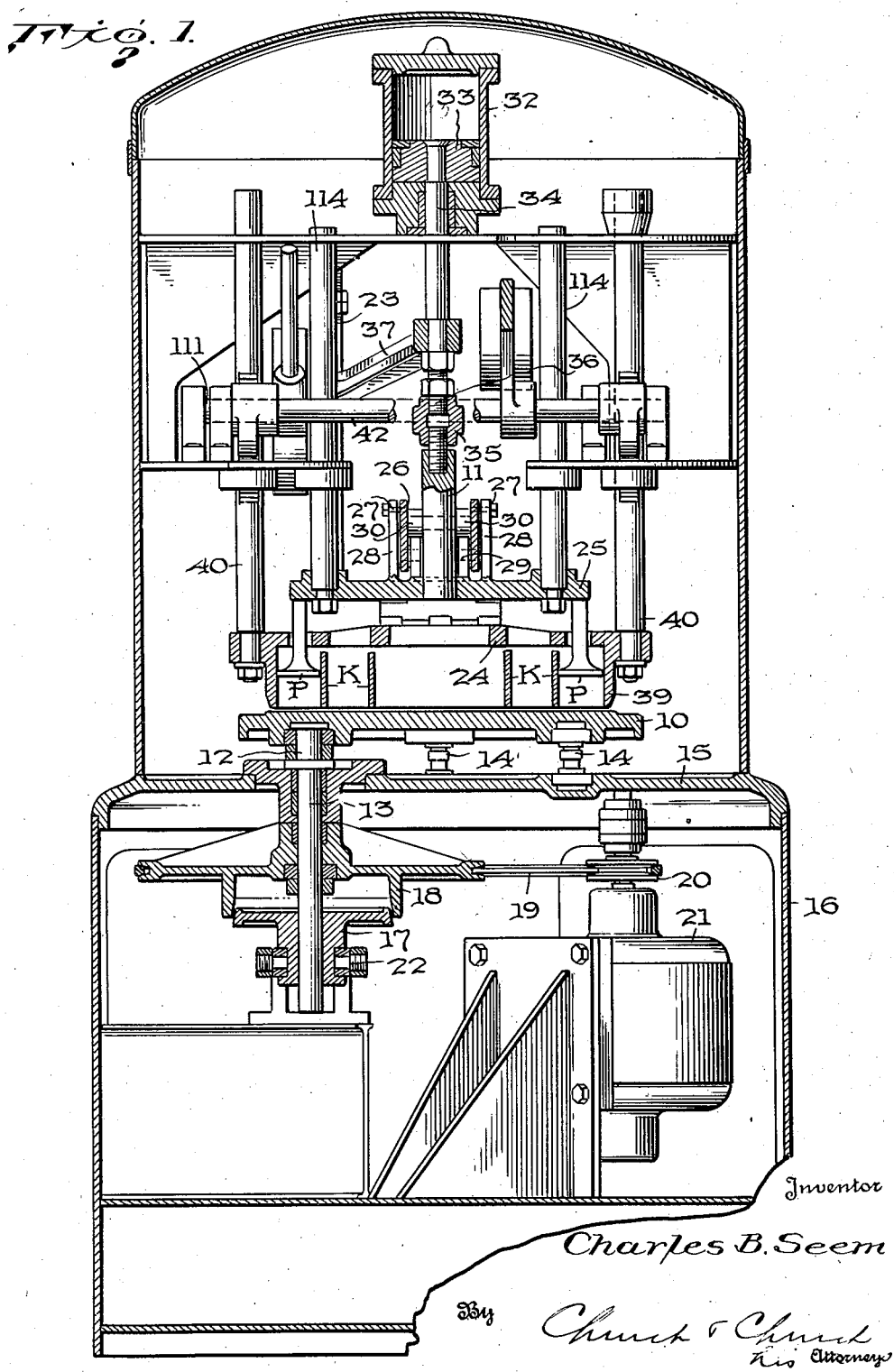
Figure 1 is a front view, partly in section, of a dough divider and rounder, embodying the present improvements.

In machines of this type, the mass of dough to be divided and rounded-up is supported on a pallet placed on a table 10 below a vertically movable divider head carried on a stem 11. The divider head comprises a plurality of radial and circular knives K that form individual roll pockets in which presser plugs P are provided, the plugs and knives being releasably locked together whereby they can be lowered as a body to first press a lump of dough flat on the table, after which the knives are released and lowered further to subdivide the dough into a plurality of increments which, as a group, represent a pan of rolls. The divider head construction, per se, forms no part of the present invention and is not shown or described in detail herein, but reference is made to United States Letters Patent No. 1,177,835, dated April 4, 1916, for a full disclosure thereof. After the mass of dough is thus subdivided, and while the several increments of dough are retained in the pockets formed by the knives of the divider head, the table 10 is given a gyratory motion which causes the increments to be rounded-up into balls or rolls. For this purpose, the table 10 is supported on a crank 12 on crank shaft 13 and additional cranks 14 which, together with shaft 13, are supported in a top plate 15 for the base section 16 of the machine housing. Keyed on shaft 13 is a clutch member 17 movable into and out of engagement with a pulley 18 loose on said shaft and adapted to be driven by a belt 19 from a drive pulley 20 on the shaft of a motor 21. Clutch member 17 is adapted to be raised and lowered by clutch lever 22 connected to a clutch operating rod 23, all as will be later described. These means for imparting the gyratory motion to table 10 are more fully shown and described in United States Letters Patent No. 1,764,586, dated June 17, 1930.

In the present machine, the knives K of the divider head are carried on a plate 24, fast on stem 10, and the plugs P are carried on a plug plate 25 which is adapted to be releasably latched to the knife plate and stem by a manually operable latch lever 26 pivoted at 27 in standards 28 on the knife plate. The latch lever has projections 29 engageable under latch rollers 30 journaled on a cross pin in stem 11. When projections 29 are engaged under the rollers, the knives and plugs can be lowered in unison, but, when the forward end of lever 26 is depressed to disengage the projections, the knives can be lowered independently of the plugs. A counterweight 31 on latch lever 26 causes the latter to return to normally latched position when the knives are raised a sufficient distance relatively to the plugs, all as described in said Patent No. 1,177,835. The stem 11, together with the divider head, is raised and lowered by power actuated mechanism, which, in the present instance, comprises a cylinder 32 to which an actuating fluid is delivered for reciprocating a piston 33 therein, the piston rod 34 of said piston constituting an extension of the stem of the divider head. The over-all length of the stem and piston rod may be varied by an adjusting nut 35 on the intermediate member 36 threaded into said stem. A clutch arm 37 attached to said piston rod and to clutch rod 23, causes the clutch member 17 of the table gyrating mechanism to be rendered operative at the proper times, by reason of said arm and rod depressing clutch lever 22 when the divider head is lowered, all as more fully explained in said United States Letters Patent No. 2,158,594.

It will be understood that each mass of dough to be divided and rounded-up is deposited on a pallet 38 which, in turn, is placed on the table 10, so that each pan of rolls can be readily removed. To properly confine the dough on the pallet while it is being pressed, divided and rounded-up, there is a confining ring member 39 which is also adapted to be raised to permit placement of the pallet and dough on the table to confine the latter while it is operated upon. Preferably, this ring 39 is raised and lowered manually. For instance, it may be carried by rack bars 40 slidable in suitable guides above the table, with the racks engaging pinions 41 on a shaft 42 which can be rocked by an operating lever 43. The lever 43 is provided with a counterbalance 44 for retaining the ring in elevated position.

As previously indicated, there have been instances where the attendants, in operating dividers of this type, have permitted the divider head to be lowered, before the ring has been lowered, and injured themselves by having their hands mashed between the divider head and table. To prevent such accidents, the present invention provides an interlock between the ring actuating mechanism and the divider head actuating instrumentalities, whereby the divider head cannot be lowered unless and until the ring has been lowered. Referring particularly to Fig. 4, actuating fluid for cylinder 32 is supplied by a pump 45 from a reservoir or tank 47 through line 48, to the inlet 49 of a four-way pilot control valve 50, and from the latter it is delivered through outlet 51 and line 52 to the upper end of the cylinder or through outlet 53 and line 54 to the lower end of said cylinder, depending upon the position of the plunger 55 of said valve 50. The pump 45 may be driven from motor 21 through a flexible coupling 46. Associated with one of the rack bars 40 is another pilot valve 56 whose plunger or spool having a roller 57 thereon is normally extended but is adapted to be depressed by an enlargement 58 on said rack bar engaging said roller when said bar is lowered. The arrangement of ports in said spool or plunger is such that, when the plunger is in its normal extended position, inlet port 59 of the valve is in communication with outlet port 60, which is connected by a line 61 to one end of pilot control valve 50, while, on the other hand, when the roller 57 and spool of this pilot valve 56 are depressed by the rack bar, inlet port 59 is in communication with port 62 and line 63 which is connected to the opposite end of the pilot control valve 50. In other words, when the ring and the rack bars are in their elevated positions, the position of spool of pilot valve 56 is such that the plunger 55 of control valve 50 will be in the lefthand position, as viewed in Fig. 4, under which circumstances the lower end of cylinder 32 will be filled with fluid to retain the divider head in its upper position. After a pallet, with dough on it, has been loaded on table 10 and the ring 39 lowered, the consequent depression of the spool of pilot valve 56 will result in the plunger of control valve 50 being moved to the right, as viewed in Fig. 4, whereby fluid will be delivered through line 51 to the upper end of cylinder 32 to depress the divider head. This, of course, cannot occur until the ring has been lowered onto the pallet or table, due to the location of enlargement 58 on the rack bar. Interposed in supply line 48 is a relief valve 66 from which fluid is supplied through a line 67 to the inlet port 59 of pilot valve 56. This relief valve is also connected by line 68 to the exhaust line 69 from control valve 50, it being understood that, in the operation of valve 50, said exhaust line is always in communication with one or the other of lines 52 or 54, depending upon which one of said lines is in communication with supply line 48.

To reduce the working pressure on the pump at the end of each stroke of the piston in cylinder 32, the latter is provided with venting ports 70, 71 (Fig. 8), connected by lines 72, 73 to lines 61, 63, respectively, of the pilot valve 56. The location of these two venting ports in the cylinder is such that they are alternately opened as the piston reaches the ends of its successive working strokes. Cylinder 32 is also provided with exhaust ports 74, 75 connected by line 76 to tank 47, these ports also being so located lengthwise of the cylinder as to be uncovered, alternately, as the piston reaches opposite ends of the cylinder in its successive working strokes.

The complete cycle of operations of the machine will now be described, starting with the confining ring 39 raised as shown in Fig. 4, under which circumstances the divider head operating piston will be in the upper end of cylinder 32, by reason of the fact that the inlet of valve 56 is in communication with port 60 and line 61, and line 54 is connected to main supply line 48 through valve 50. After the pallet with the dough has been placed on table 10, the attendant raises operating lever 43 which rocks shaft 42 and lowers the racks 40 until ring 39 rests on the pallet around the dough. As the enlargement 58 on the rack bar descends, it engages and depresses the spool or plunger of valve 56, whereby inlet port 59 will be placed in communication with port 62 and line 63 and plunger 55 of valve 50 will be moved to the right, thus establishing communication between main supply line 48 and line 52 leading to the upper end of cylinder 32. The actuating fluid thus admitted to the upper end of cylinder 32 will cause the piston and divider head to be depressed or lowered. During this downward movement of the divider head piston line 54 from the lower end of cylinder 32 will be connected through control valve 50 to exhaust line 69 to drain the lower end of said cylinder.

After the divider head has been lowered sufficiently to properly press or flatten the dough on the pallet, the attendant trips latch lever 26 and releases the knives which are then advanced or pressed downwardly through the dough to divide the same. As the knives reach the lower limit of their downward movement, the accompanying downward movement of clutch rod 23 will rock clutch lever 22 and render the table gyrating mechanism operative. After the lumps of dough have been properly rounded-up—a matter left to the attendant's judgment—he lowers the operating lever 43 and raises ring 39 and rack 40 to a point where the enlargement 58 will permit the spool of valve 56, which is normally urged outwardly, to return slightly toward its extended position. This partially establishes communication between ports 59 and 60 of valve 56, so that the plunger of control valve 50 will be moved sufficiently to establish communication between supply line 48 and line 54 to raise the divider head to a point where clutch 17 will be disengaged. This will permit table 10 to come to rest, after which operating lever 43 is pulled down to its lower limit of movement which fully raises the confining ring and permits the spool of pilot valve 56 to extend itself to the outer limit of its movement. The pallet, with the rounded-up pan of rolls, is then removed and another pallet, with dough, placed on the table preparatory to the next cycle of operations. It might be added that the ring is only raised slightly at first, after the dough is rounded-up, as it is better to not fully raise the ring and release the dough while the table is still in motion.

The construction of valve 50 is illustrated generally in Fig. 5. The valve plunger 55 is slidable in the bore of the valve by fluid admitted first to one end of the valve casing, and then the other from lines 61, 63. This plunger is provided with ducts 77 and 78 which are adapted to alternately communicate with the inlet 48 through a duct 79 so as to alternately connect lines 52 and 54 with the fluid supply. The plunger is also of reduced diameter intermediate its ends, as at 80, for a length to establish communication between exhaust line 69 and either of lines 51, 54, depending upon the position of the plunger.

The pilot valve 56 is shown in section in Fig. 6. The spool or plunger 81 is normally held extended by a spring 82 within the valve casing, in which position a duct 83 in the surface of the plunger connects port 59 with port 60, while port 62 is blocked off. However, when plunger 81 is depressed, duct 83 connects port 59 with port 62, and port 60 is blocked off. A key 84 extending through the valve casing prevents plunger 81 rotating. The port 64, connected to drain 65, is merely for relieving seepage of fluid around the plunger. In this connection, it should also be stated that, in the case of lines 61 and 63, connected to valve 50, there is sufficient bleeding ecapement in valve 50 to permit said valve to operate in both directions.

Fig. 7 illustrates the form of relief valve which is preferred. In the construction, the valve comprises a passage 87 formed as a continuation of an inlet port 88 and an outlet port 89 for the main feed line 48. The exhaust or relief port to which relief line 69 is connected is indicated at 91, but is normally closed by a plunger valve 92 which is held seated by a spring 93 as well as by pressure of fluid being pumped, due to the fact that this fluid in passage 87 has access to a cavity 105 and to the upper surface of the plunger through a port 94 in an enlargement 95 on the valve stem. In order to prevent abnormal pressure being imposed on the upper surface of this enlargement, the casing of the valve is also formed with a passage 96 which connects through a valve controlled passage 97 with another passage 98 which, in turn, discharges into a cavity 99 in the upper part of the valve casing and which is constantly in communication with exhaust port 91 by means of a duct 100 formed axially of the valve stem. Passage 97 is controlled by a ball check valve 101 held against its seat by a spring 102, the pressure of the spring on said valve 101 being regulated by a screw 103 which may be provided with a lock nut 104. By properly adjusting screw 103, fluid pressure will build up in the space above enlargement 95 until sufficient pressure is created to unseat ball-valve 101, whereupon additional fluid flowing through passage 94 can escape through passages 96 and 97 and through the duct 100 in the plunger valve to port 91 and the attached exhaust line. On the other hand, if an excessive pressure should build up in the system at any point beyond this relief valve, as soon as the back pressure exceeds the normal pressure on the upper surface of enlargement 95, valve 92 will be unseated and relieve such back pressure.

Also communicating with cavity 105 in the relief valve is a duct 106 leading to a port 107 to which is attached the feed line 67 for pilot valve 56. This connection also serves for venting the relief valve, this being accomplished by having the ports 70, 71 in cylinder 32 connected to the lines 61, 63 of the pilot valve 56, as previously described.

As previously described, the table 10 is supported on the top plate 15 of the base section of the housing. This base section of the housing is of cylindrical shape, preferably made of sheet metal, and encloses the motor unit and the mechanism for gyrating the table. Supported on the top plate 15 is the upper section 16A of the housing. This upper section is, likewise, of sheet metal and cylindrical in form, but is cut away at the front in order to give access to the table and divider head. Otherwise, it completely encases all the operating mechanisms above the top plate 15. To impart rigidity to this sectional housing, the top plate 15 is provided with a plurality of sockets or recesses 106 for reception of threaded extensions 107 which may be welded to the inner surface of the upper housing section. The extensions are secured in their sockets by nuts threaded on the extensions, but which may be removed if it is desired to remove the upper section of the housing. Thus, the entire machine is given a pleasing, streamlined appearance.

Usually, in machines of this type, means are provided for relieving pressure of the plugs P on the increments of dough during the rounding-up operation. For instance, as shown, the plate 25, carrying the plugs, may be provided with guide stems 114 having racks thereon in engagement with segments or pinions 113 on a shaft 111 on which there is mounted a lever arm 110 carrying an adjustable counterbalance 112. As the plugs, with the knives, are lowered, this counterbalance will be raised, but, when latch 26 is tripped, and the plug plate released from the knife plate or stem, the counterbalance, returning to its normal, lower position, will rock shaft 111 and pinions 113 and the latter will elevate the stems or rods 114 and the plug plate.

What I claim is:

1. In a dough divider and rounder comprising a dough supporting surface, a divider head having presser blocks and knives for pressing and dividing a mass of dough on said surface, and fluid actuated means for raising and lowering said head, the combination of a ring for confining the mass of dough on said surface, means for moving said ring vertically with respect to said surface, and means responsive to the movements of said ring for controlling the operation of said fluid actuated means by which the head is raised and lowered.

2. In a dough divider and rounder having a dough supporting surface, a divider head comprising presser blocks and knives for pressing and dividing a mass of dough on said surface, and means for raising and lowering said head, the combination of a ring for confining the dough on said surface, means for moving said ring vertically with respect to said surface, and means responsive to the movements of said ring for controlling operation of said head raising and lowering means.

3. In a dough divider and rounder comprising a group of divider knives and a group of presser plugs for pressing and dividing a mass of dough on a supporting surface on which the dough is confined by a ring member, manually operable means for raising and lowering said ring and fluid pressure operated means for raising and lowering said plugs and knives, the combination of means actuated by said ring operating means for controlling said fluid actuated means.

4. In a dough divider and rounder comprising a dough supporting surface, a divider head having knives and presser plugs for pressing and dividing a mass of dough on said surface, and a fluid actuated piston for raising and lowering said head, the combination of a ring for confining the mass of dough on said surface, mechanism for raising and lowering said ring, and a valve controlling the actuating fluid for said piston operable by said ring mechanism whereby said head can be lowered only after said ring has been lowered.

5. In a dough divider and rounder comprising a dough supporting surface, a divider head having knives and presser plugs for pressing and dividing a mass of dough on said surface, a cylinder, a piston in said cylinder on which said head is carried, and means for supplying an actuating fluid to said cylinder for raising and depressing said head, the combination of a ring for confining a mass of dough on said surface, mechanism for raising and lowering said ring relatively to said surface, and means operable by said ring for preventing flow of fluid to said cylinder to lower said head when said ring is in its raised position.

6. In a dough divider and rounder comprising a dough supporting surface, a divider head having knives and presser plugs for pressing and dividing a mass of dough on said surface, a cylinder, a piston in said cylinder on which said head is carried, and means for supplying an actuating fluid to said cylinder for raising and depressing said head, said fluid supply means comprising a valve for directing the fluid to opposite ends of said cylinder, the combination of a ring for confining the dough on said surface, said ring being movable vertically relatively to said surface, and means responsive to the movement of said ring for actuating said valve to prevent flow of fluid to said cylinder for depressing the divider head when the ring is raised from its lower position.

7. In a dough divider and rounder comprising a dough supporting surface, a divider head having knives and presser plugs for pressing and dividing a mass of dough on said surface, and a fluid actuated piston for raising and depressing said head, the combination of a ring for confining the dough on said surface, supporting means for said ring comprising a vertically movable member, means for moving said member vertically, and means operable by said member for controlling said piston to prevent operation of the latter to depress said head when said ring and its supporting member are elevated.

8. In a dough divider and rounder comprising a dough supporting surface, a divider head having knives and presser plugs for pressing and dividing a mass of dough on said surface, and a fluid actuated piston for raising and depressing said head, the combination of a ring for confining the dough on said surface, supporting means for said ring comprising a vertically movable member, means for moving said member vertically, a valve for controlling the operation of said piston, and means carried by said ring supporting member engaging said valve to actuate the latter and prevent operation of said piston and depression of said head when said ring and its supporting member are elevated.

9. In a roll divider and rounder comprising a dough support, means comprising a cam shaft and driving connections therefor for gyrating said support, and a divider head comprising knives and presser blocks for pressing and dividing a mass of dough on said support, the combination of a housing for said mechanisms comprising a cylindrical base section, a base top in which said cam shaft and dough support are supported with the driving connections for said shaft encased in said base section, and an upper cylindrical section having its lower edge supported entirely on said base top and enclosing said divider head, said upper section having an opening at its front to afford access to said divider head and dough support.

10. In a roll divider and rounder comprising a dough support, means comprising a cam shaft and driving connections therefor for gyrating said support, and a divider head comprising knives and presser blocks for pressing and dividing a mass of dough on said support, the combination of a housing for said mechanisms comprising a cylindrical base section, a base top in which said cam shaft and dough support are supported with the driving connections for said shaft encased in said base section, an upper cylindrical section having its lower edge supported entirely on said base top and enclosing said divider head, said upper section having an opening at its front to afford access to said divider head and dough support, and extensions on said upper section projecting through said base top and secured thereto.

11. In a roll divider and rounder comprising a dough support, means comprising a cam shaft and driving connections therefor for gyrating said support, and a divider head comprising knives and presser blocks for pressing and dividing a mass of dough on said support, and a housing for said mechanisms, said housing having in combination cylindrical upper and lower sections, a top for said lower section seated on said lower section and forming the sole support for the upper section of said housing, said top having sockets therein and extensions on said upper section secured in said sockets, said dough support and cam shaft being supported by said lower section top, said driving mechanism being enclosed within said lower section, said divider head being encased by said upper section, and said upper section having an opening therein through which said divider head and dough support are accessible.

CHARLES B. SEEM.